(12) United States Patent
Swan et al.

(10) Patent No.: US 10,401,514 B2
(45) Date of Patent: Sep. 3, 2019

(54) SEISMIC AZIMUTHAL GRADIENT ESTIMATION

(71) Applicant: CONOCOPHILLIPS COMPANY, Houston, TX (US)

(72) Inventors: Herbert Swan, Houston, TX (US); Jack Howell, Houston, TX (US); Anastasia Mironova, Houston, TX (US)

(73) Assignee: CONOCOPHILLIPS COMPANY, Houston, TX (US)

(*) Notice: Subject to any disclaimer, the term of this patent is extended or adjusted under 35 U.S.C. 154(b) by 41 days.

(21) Appl. No.: 15/185,320

(22) Filed: Jun. 17, 2016

(65) Prior Publication Data
US 2017/0031042 A1 Feb. 2, 2017

Related U.S. Application Data

(60) Provisional application No. 62/181,009, filed on Jun. 17, 2015.

(51) Int. Cl.
| | | |
|---|---|---|
| *G01V 1/30* | (2006.01) | |
| *G01V 1/28* | (2006.01) | |
| *G01V 1/36* | (2006.01) | |

(52) U.S. Cl.
CPC ............... *G01V 1/302* (2013.01); *G01V 1/28* (2013.01); *G01V 1/30* (2013.01); *G01V 1/36* (2013.01); *G01V 2210/632* (2013.01)

(58) Field of Classification Search
CPC ................................. G01V 1/302; G01V 1/28
USPC .......................................................... 702/16
See application file for complete search history.

(56) References Cited

U.S. PATENT DOCUMENTS

| 5,508,973 | A | 4/1996 | Mallick et al. | |
|---|---|---|---|---|
| 6,263,284 | B1* | 7/2001 | Crider | G01V 1/286 |
| | | | | 702/14 |
| 6,681,184 | B2 | 1/2004 | Jenner et al. | |
| 6,928,367 | B2 | 8/2005 | Gray et al. | |
| 2003/0018435 | A1* | 1/2003 | Jenner | G01V 1/303 |
| | | | | 702/14 |
| 2007/0260404 | A1* | 11/2007 | Dong | G01V 1/32 |
| | | | | 702/16 |
| 2011/0222370 | A1 | 9/2011 | Downton et al. | |
| 2013/0201795 | A1 | 8/2013 | Zhou et al. | |
| 2015/0316685 | A1* | 11/2015 | Dimitrov | G01V 1/302 |
| | | | | 703/2 |
| 2016/0139282 | A1* | 5/2016 | Dimitrov | G01V 1/302 |
| | | | | 703/2 |

OTHER PUBLICATIONS

Al-Shuhail, A. A., 2007, Fracture-porosity inversion from P-wave AVOA data along 2D seismic lines: An example from the Austin chalk of southeast Texas: Geophysics, 72, No. 1, B1-B7.
Davidson, M., Swan, H., Sil, S., Howell, J., Olson, R., and Zhou, C., 2011, A robust workflow for detecting azimuthal anisotropy: SEG, Expanded Abstracts, 30, No. 1, 259-263.

(Continued)

*Primary Examiner* — Ricky Ngon
(74) *Attorney, Agent, or Firm* — Conocophillips Company

(57) ABSTRACT

Method of estimating azimuthal amplitude gradient is disclosed. This method uses a correlation of seismic attributes within a sliding volume of data to obtain azimuthal gradient.

18 Claims, 11 Drawing Sheets

(56) References Cited

OTHER PUBLICATIONS

Davison, C., Ratcliffe, A., Grion, S., Johnston, R., Duque, C., and Maharramov, M., 2011, Azimuthal AVO analysis: Stabilizing the model parameters: SEG, Expanded Abstracts, 30, No. 1, 330-334.

Downton, J., and Gray, D., 2006, AVAZ parameter uncertainty estimation: SEG, Expanded Abstracts, 25, No. 1, 234-238.

Downton, J., Roure, B., and Hunt, L., 2011, Azimuthal Fourier coefficients: CSEG Recorder, 36, No. 10, 22-36.

Gray, D., and Head, K., 2000a, Fracture detection in Manderson field: A 3-D AVAZ case history: The Leading Edge, 19, No. 11, 1214-1221.

Gray, D., Roberts, G., and Head K., 2002, Recent advances in determination of fracture strike and crack density from P-wave seismic data: The Leading Edge, 21, No. 3, 280-285.

Jenner, E., 2002, Azimuthal AVO: Methodology and data examples: The Leading Edge, 21, No. 8, 782-786.

Mallick, S., and Frazer, L. N., 1987, Practical aspects of reflectivity modeling: Geophysics, 52, No. 10, 1355-1364.

Mallick, S., Craft, K. L., Meister, L. J., and Chambers, R. E., 1998, Determination of the principal directions of azimuthal anisotropy from P-wave seismic data: Geophysics, 63, No. 2, 692-706.

Ruger, A., and Tsvankin, I., 1997, Using AVO for fracture detection: Analytic basis and practical solutions: The Leading Edge, 16, No. 10, 1429-1434.

Ruger, A., 1995, P-wave reflection coefficients for transversely isotropic media with vertical and horizontal axis of symmetry: SEG, Expanded Abstracts, 14, 278-281.

Ruger, A., 1997, Plane wave reflection coefficients for transversely isotropic models with vertical and horizontal axis of symmetry: Geophysics, 62, No. 3, 713-722.

Ruger, A., 2000, Variation of P-wave reflectivity with offset and azimuth in anisotropic media: Geophysics, vol. 63, No. 3, p. 935-947 (1998).

Swan, H. W., 1990, Amplitude versus offset measurement errors in a finely layered medium: Geophysics, 56, No. 1, 41-49.

Thomsen, L., 1986, Weak elastic anisotropy: Geophysics, 51, No. 10, 1954-1966.

Tsvankin, I., 1996, P-wave signatures and notation for transversely isotropic media: An overview: Geophysics, 61, No. 2, 467-483.

Wang, J., Zheng, Y., and Perz, M., 2007, VVAZ vs. AVAZ: Practical implementation and comparison of two fracture-detection methods: SEG, Expanded Abstracts, 26, No. 1, 189-193.

Whitcombe, D. N., Dyce, M., McKenzie, C. J. S., and Hoeber, H., 2004, Stabilizing the AVO gradient: SEG, Expanded Abstracts, 23, No. 1, 232-235.

Xu, X., and Tsvankin, I., 2006, Azimuthal AVO analysis with anisotropic spreading correction: A synthetic study: The Leading Edge, 25, No. 11, 1336-1342.

Zheng, Y., and Larson, G., 2004, Seismic fracture detection: Ambiguity and practical solution: SEG, Expanded Abstracts, 23, No. 1, 1575-1578.

Veeken, P.C.H., et al., "AVO attribute analsyis and seismic reservoir characterization." In: First Break. Feb. 2006 (Feb. 2006) Retrieved from <http://kms.geo.net/fileadmin/docs/AVO_attribute_analysis_ and seismic reservoir characterization.pdf> entire document.

Ruger, A. and Gray, D., 2014, 2. "Wide-azimuth amplitude-variation-with-offset analysis of anisotropic fractured reservoirs." Encyclopedia of Exploration Geophysics: pp. N1-1-N1-13.

International Search report for PCT/US2016/038025 dated Sep. 9, 2016.

\* cited by examiner

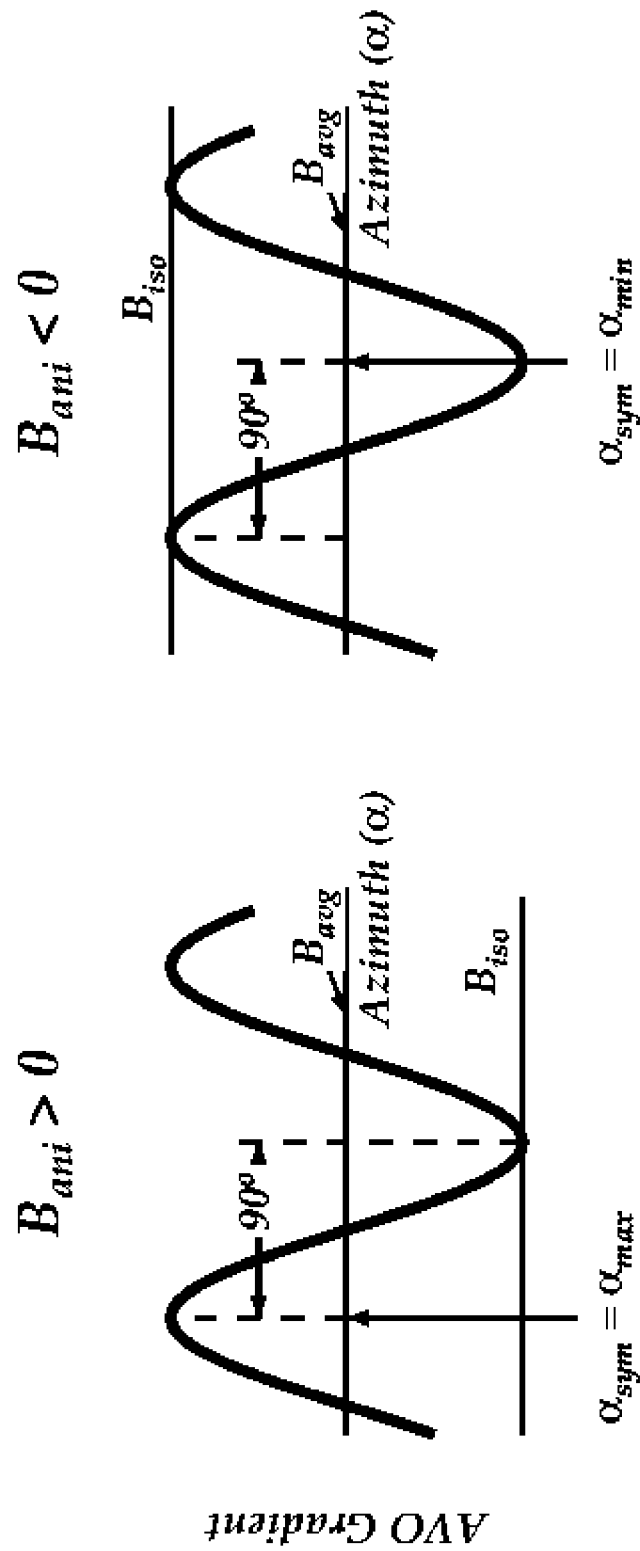

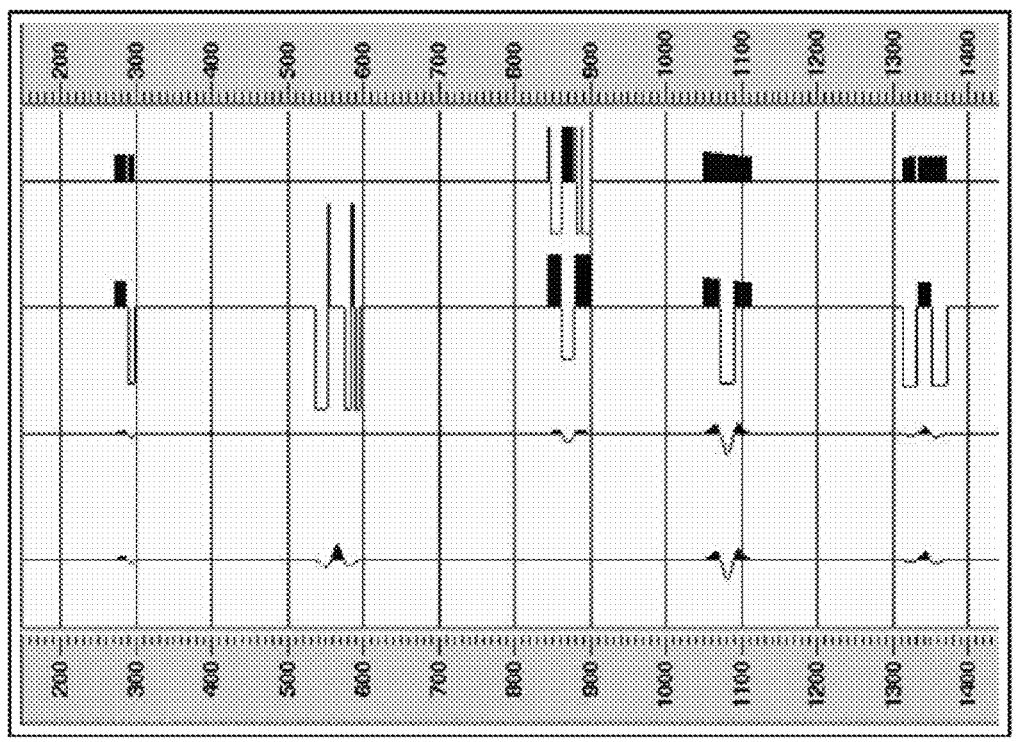

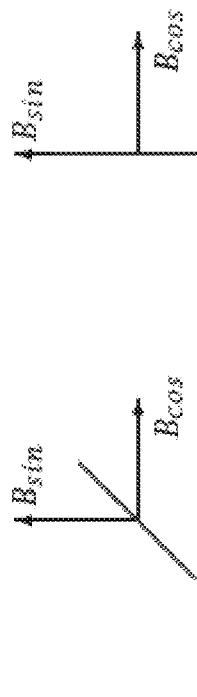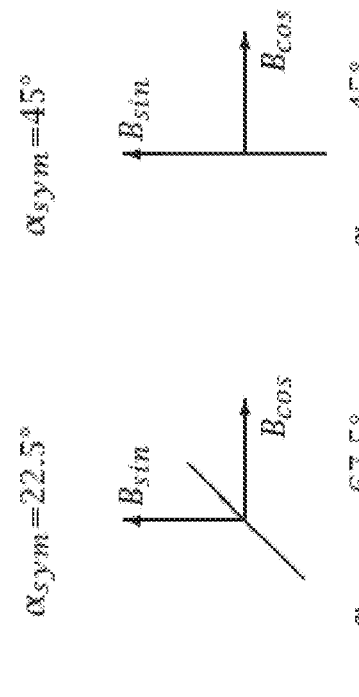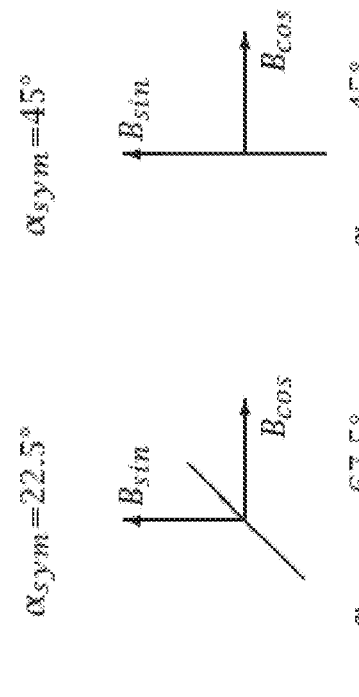

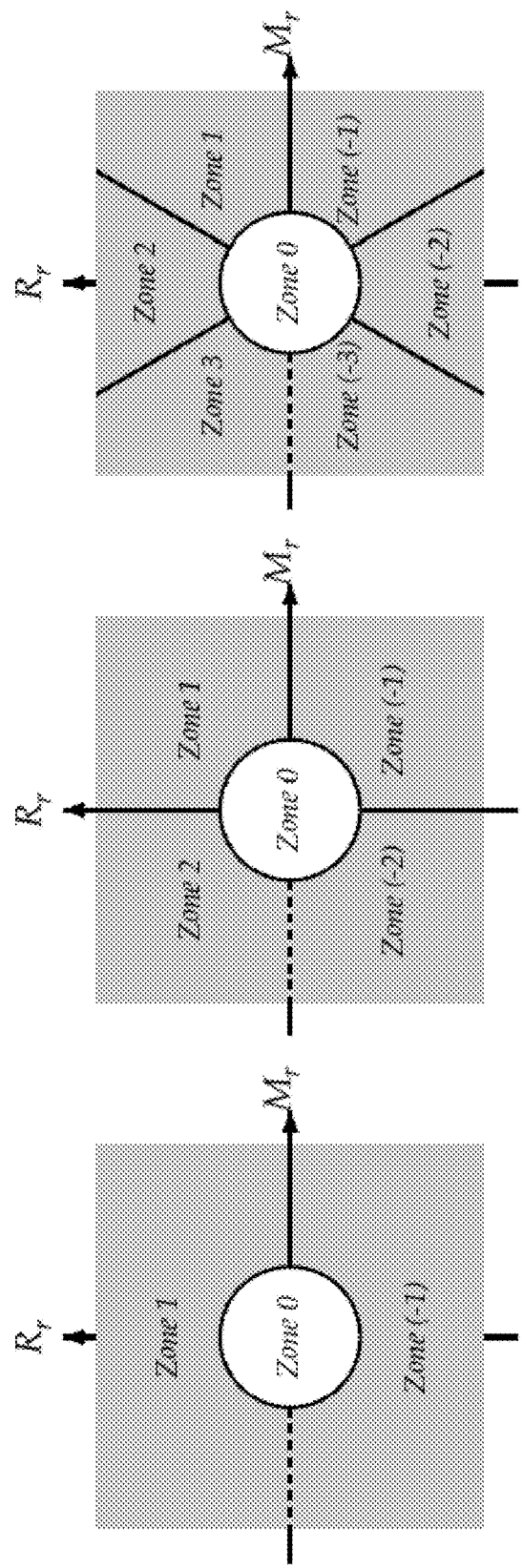

SEISMIC AZIMUTHAL GRADIENT ESTIMATION

PRIOR RELATED APPLICATIONS

This application is a non-provisional application which claims benefit under 35 USC § 119(e) to U.S. Provisional Application Ser. No. 62/181,009 filed Jun. 17, 2015, entitled "SEISMIC AZIMUTHAL GRADIENT ESTIMATION," which is incorporated herein in its entirety.

FIELD OF THE INVENTION

This invention generally relates to seismic data processing. More specifically, the present invention relates to estimation of azimuthal amplitude gradient using correlation of seismic attributes within a sliding volume of seismic data.

BACKGROUND OF THE INVENTION

In reflection seismology, azimuthal amplitude gradient represents the change in reflected seismic amplitude with respect to source-receiver azimuth. It is often desirable to use the azimuthal amplitude gradient, derived from seismic data, to determine orientation and magnitude of reservoir fractures and of geologic stress fields. Conventionally, azimuthal amplitude gradient is typically estimated at each point separately in a seismic survey. However, this point-wise estimation approach can be limited by various factors such as noise, data misalignments at different azimuths, and ambiguity between gradient polarity and symmetry azimuth.

One method of determining or estimating azimuthal amplitude gradient is known as amplitude variations with azimuth (AVAZ). AVAZ analysis takes advantage of the fact that rocks often exhibit different properties along paths of maximum and minimum stress and/or along paths parallel and perpendicular to fractures. A fundamental ambiguity in AVAZ analysis has been recognized for some time and can be seen in FIG. 2 (discussed later).

BRIEF SUMMARY OF THE DISCLOSURE

This invention computes the azimuthally-varying component of seismic amplitudes in a more stable and robust way as compared to conventional point-wise method generally in use today.

One example a method for processing 3-D seismic data includes: a) forming, using a computing processor, common image location gathers of seismic traces as a function of time or depth, offset, and azimuth; b) performing a linear regression on a gather at each time or depth to generate a model that includes an intercept term A, an average gradient term $B_{avg}$, an anisotropic gradient term $B_{cos}$, and an anisotropic gradient term $B_{sin}$; c) calculating joint correlations of $B_{cos}$ and $B_{sin}$ seismic traces over a plurality of rectangular prisms in lateral position and time or depth, each prism centered about its own analysis point; d) forming a vector whose rectangular coordinates are (M, R) for each analysis point, wherein M represent half of difference between mean-squared amplitudes of $B_{cos}$ and $B_{sin}$ within the prism, and R represent the average product of $B_{cos}$ and $B_{sin}$ within the prism; e) calculating angles $2\theta_{up}$ or $2\theta_{down}$ the vector makes with the M axis; f) taking one-half the rotation angles $\theta_{up}$ or $\theta_{down}$ as symmetry azimuths of vertical reservoir fractures; and g) determining azimuthal amplitude gradient based on the determined symmetry azimuth.

Another example of a method for processing 3-D seismic data includes: a) forming common image location gathers of seismic traces as a function of time or depth, offset, and azimuth; b) performing a linear regression, using a computing processor, on a gather at each time or depth to generate a model that includes an intercept term A, an average gradient term $B_{avg}$, an anisotropic gradient term $B_{cos}$, and an anisotropic gradient term $B_{sin}$; c) calculating joint correlations of $B_{cos}$ and $B_{sin}$ seismic traces over a plurality of rectangular prisms in lateral position and time or depth, each prism centered about its own analysis point; d) forming a vector whose rectangular coordinates are (M, R) for each analysis point, wherein M represent half of difference between mean-squared amplitudes of $B_{cos}$ and $B_{sin}$ within the prism, and R represent the average product of $B_{cos}$ and $B_{sin}$ within the prism; e) calculating angles $2\theta_{up}$ or $2\theta_{down}$ the vector makes with the M axis; f) determining one-half the rotation angles $\theta_{up}$ or $\theta_{down}$ as symmetry azimuths of vertical reservoir fractures; g) determining azimuthal amplitude gradient based on the determined symmetry azimuth; and h) detecting one or more subsurface heterogeneity utilizing the determined azimuthal amplitude gradient.

BRIEF DESCRIPTION OF THE DRAWINGS

A more complete understanding of the present invention and benefits thereof may be acquired by referring to the follow description taken in conjunction with the accompanying drawings in which:

FIGS. 2A-2B shows side by side comparison of azimuthal gradient polarity (FIG. 2A) and symmetry azimuth (FIG. 2B).

FIG. 4A-4B shows conversion of $B_{cos}$ (FIG. 4A) and $B_{sin}$ (FIG. 4B) traces in $\alpha_{max}$ (FIG. 4C) and $\alpha_{up}$ (FIG. 4D) azimuth traces.

FIGS. 6A-6H show ideal crossplots of $B_{sin}$ versus $B_{cos}$ for various symmetry azimuths and spins. FIG. 6A shows for $\alpha_{sym}=-22.5°$. FIG. 6B shows for $\alpha_{sym}=0°$. FIG. 6C shows for $\alpha_{sym}=22.5°$. FIG. 6D shows for $\alpha_{sym}=45°$. FIG. 6E shows for $\alpha_{sym}=67.5°$. FIG. 6F shows for $\alpha_{sym}=-90°$. FIG. 6G shows for $\alpha_{sym}=-67.5°$. FIG. 6H shows for $\alpha_{sym}=-45°$.

FIG. 7A shows plot of a vs b. FIG. 7B shows plot of the down interpretation. FIG. 7C shows plot of $R_r$ vs M cos 2φ. FIG. 7D shows plot of the up interpretation.

FIGS. 11A-11C show divisions of (R, M) plane.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated.

The following examples of certain embodiments of the invention are given. Each example is provided by way of explanation of the invention, one of many embodiments of the invention, and the following examples should not be read to limit the scope of the invention.

The present invention provides tools and methods for estimating azimuthal amplitude gradient using correlation of seismic attributes within a sliding volume of seismic data ("windowed statistical method"). As used herein, "azimuthal amplitude gradient" represents a change in seismic amplitude with respect to source-receiver azimuth or orientation of source-receiver line. In one embodiment, a new method of performing AVAZ analysis is provided. One of the goals of this method is to obtain estimates of symmetry azimuth $\alpha_{sym}$ that is more stable in the presence of noise and small misalignments of data from one azimuth to the next and to resolve the ambiguity between gradient polarity and symmetry azimuth. These estimations can be used to detect subsurface heterogeneities such as, but not limited to, faults, fractures, stratigraphic discontinuities, and the like. Other advantages will be apparent from the disclosure herein.

In combination with well information or prior geologic constraints, the estimation azimuthal amplitude gradient can infer the orientations and magnitudes of fractures away from the well. Such information is valuable for developing oil and gas resources, particularly where artificial fracturing of reservoir rock is required. Moreover, the present invention can utilize well control and/or prior geologic information to resolve fundamental ambiguity problem generally encountered in AVAZ analysis.

Ambiguity of AVAZ Analysis

Figure 1:
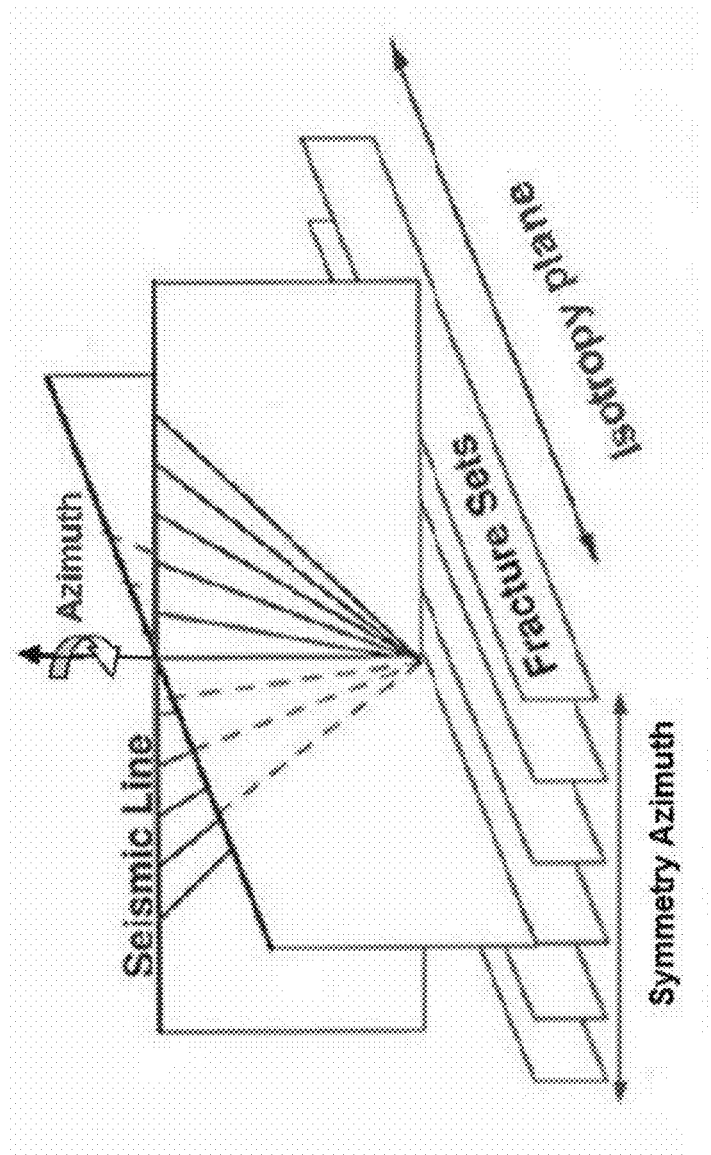
FIG. 1 shows a collection 3D seismic data over a thin reservoir having vertical fractures oriented perpendicular to symmetry azimuth.

FIG. 1 illustrates one typical geometry associated with seismic data collection. As shown in FIG. 1, 3D seismic data can be collected over a thin reservoir having fractures oriented perpendicular to the symmetry azimuth. In such a setup, 3D seismic data can be recorded over a variety of source-receiver azimuths. Ray paths in this figure all reflect off the top of a vertically fractured reservoir interval, which is modeled as being anisotropic, but having transverse isotropy with a horizontal axis of symmetry ("HTI medium"). To a first approximation, amplitude of a plane P-wave ($R_p$) reflected from such an interface varies both with source-receiver azimuth $\alpha$ and incidence angle $\psi$ with respect to a ray normal to the interface:

$$R_p(\alpha,\psi)=A+B(\alpha)\sin^2\psi \qquad (1)$$

Constant term A is normal-incidence reflection coefficient, which equals half of the fractional change of acoustic impedance across the interface. The term A depends neither on the azimuth nor the incidence angle. Coefficient $B(\alpha)$ is the amplitude gradient, and it specifies how rapidly the reflected amplitude changes with incidence angle $\psi$ at any azimuth $\alpha$. The amplitude gradient has the following two components:

$$B(\alpha)=B_{iso}+B_{ani}\cos^2(\alpha-\alpha_{sym}) \qquad (2)$$

In equation (2), $\alpha_{sym}$ represents symmetry azimuth of the fracture sets, as shown in FIG. 1, and $B_{ani}$ is the anisotropic gradient. The symmetry azimuth in this model is horizontal and perpendicular to the fractures. The $B_{iso}$ term is the amplitude gradient in the isotropy plane parallel to the fractures, when $\alpha=\alpha_{sym}\pm90°$.

FIGS. 2A-2B illustrate the fundamental ambiguity problem with conventional AVAZ analysis. FIGS. 2A-2B plot reflection amplitude at a fixed incidence angle as a function of source-receiver azimuth. If $B_{ani}$ is positive, FIG. 2A applies. In this case, $B_{iso}$ must be positive and the symmetry azimuth $\alpha_{sym}$ is as is shown. If $B_{ani}$ is negative, FIG. 2B applies. Now $B_{iso}$ must be negative and the symmetry azimuth is separated by 90° from what it was before. However, the amplitudes as functions of azimuth are identical in the two cases. Because of this ambiguity, it is impossible to determine, from the amplitudes alone, which scenario applies.

Fracture Detection by AVAZ Analysis Using the Standard Point-Wise Method

In order to use a linear regression to extract the desired parameters from equation (2), namely $B_{iso}$, $B_{ani}$ and $\alpha_{sym}$, the terms can be linearized as a sum coefficients to be determined, each multiplied by a fixed basis function that is independent of the data:

$$B(\alpha)=B_{avg}+B_{cos}\cos 2\alpha+B_{sin}\sin 2\alpha \qquad (5)$$

where $B_{avg}$ is an average over all azimuths and where $$B_{cos}=\tfrac{1}{2}B_{ani}\cos 2\alpha_{sym};\ B_{sin}=\tfrac{1}{2}B_{ani}\sin 2\alpha_{sym} \qquad (6)$$

Equation (5) is convenient in that three basis functions (1, cos $\alpha$, sin $\alpha$) are mutually orthogonal over full range of azimuths. A vector of parameters $$\vec{X}=[A,B_{avg},B_{cos},B_{sin}]^T \qquad (7)$$

is estimated from linear regression using following equation:

$$\vec{X}\approx(\Sigma_i\vec{g}_i\vec{g}_i^T+\xi I)^{-1}(\Sigma_i d_i\vec{g}_i) \qquad (8)$$

where I is the identity matrix, $\vec{g}_i$ is the vector of basis functions of the i-th seismic sample $d_i$ evaluated at its imaged point, $$\vec{g}_i=[1,\sin^2\psi_i,\cos 2\alpha_i\sin^2\psi_i,\sin 2\alpha_i\sin^2\psi_i]^T \qquad (9)$$

and $\xi$ is a stability factory sometimes needed to constrain L-2 norm of $\vec{X}$.

Figure 3B:
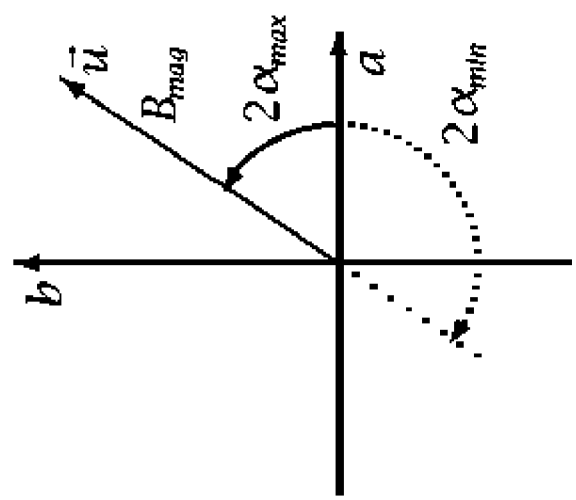
FIG. 3B shows rotation angles for window-based statistical method.
Figure 3A:
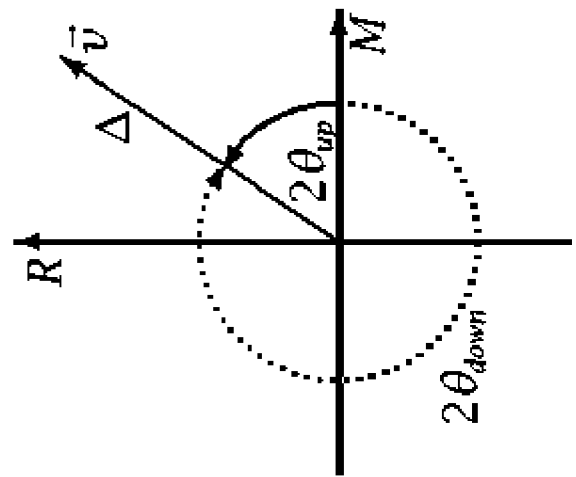
FIG. 3A shows computation of azimuths using point-wise method.

It can be seen from equation (5) that the azimuthal gradient is a vector quantity that takes two numbers to describe it at every reflection time and position. It can be expressed in Cartesian coordinates aligned with the seismic survey coordinates as it $\vec{u}=(a, b)$, where a and b to be the $B_{cos}$ and $B_{sin}$ elements of the regression vector $\vec{X}$. It can also be expressed in polar coordinates as pointwise magnitude $B_{mag}=2\sqrt{a^2+b^2}$ and azimuth of the maximum signed amplitude gradient, $\alpha_{max}$. This azimuth can then be found as half the counter-clockwise angle the $\vec{u}$ vector makes with the $\alpha$-axis, as shown in FIG. 3A. FIG. 3B illustrates rotation angles for window-based statistical method. The azimuth of the minimum gradient, $\alpha_{min}$, is half the counter-clockwise angle the vector $-\vec{u}$ makes with the $\alpha$-axis. In both cases, a clockwise angle represents a negative angle, so for in the example shown, $\alpha_{min}<0$. If $B_{ani}>0$ then $\alpha_{sym}=\alpha_{max}$. If $B_{ani}<0$ then $\alpha_{sym}=\alpha_{min}$. Since we do not know from $B(\alpha)$ alone whether $B_{ani}$ is positive or negative, an ambiguity arises in determining $\alpha_{sym}$. However, in either case, the magnitude of the anisotropic gradient $B_{mag}=|B_{ani}|$, equals twice the length of the $\vec{u}$ vector, and the amplitude gradient in the isotropy plane is given from $$B_{iso}=B_{avg}-\tfrac{1}{2}B_{ani} \qquad (10)$$

Seismic data will generally have no zero-frequency component. Whatever reflections present in the earth are convolved by a zero-mean wavelet, which has equal positive and negative areas. For example, an interface having a positive $B_{ani}$ coefficient with a zero-phase wavelet would yield value correct of $\alpha_{sym}$ in central wavelet lobe, while an azimuth that is ±90° opposite $\alpha_{sym}$ would appear in the negative side lobes of the wavelet. Since this literal interpretation of azimuth is unrealistic from a geologic perspective, it becomes critical to ensure that the polarity of $B_{cos}$ remains fixed through horizon extractions of $\alpha_{max}$ or else striping can occur.

FIGS. 4A-4B illustrate this situation with perfect synthetic $B_{cos}$ (FIG. 4A) and $B_{sin}$ (FIG. 4B) traces. As shown, $\alpha_{max}$ (FIG. 4C) switches between two perpendicular directions as seismic polarity flips. When $B_{sin}$ is near zero and $B_{cos}$<0, $\alpha_{max}$ becomes unstable but this is acceptable when understood that an azimuth of +90° is equivalent to −90° due to reciprocity. Thus, it is possible to obtain from the point-wise method a measure of azimuth that does not oscillate between two perpendicular directions. These polarity-independent azimuths can come in two types: spin-up and spin-down. Spin-up azimuths ($\alpha_{up}$) are constrained to lie within ±45°, while spin-down ($\alpha_{down}$) azimuths are constrained to lie outside this range, but inside the range ±90°. Spin-up azimuths can be derived from $\alpha_{max}$ azimuths from the following guidelines:

a. $\alpha_{up}=\alpha_{max}$ if $|\alpha_{max}|<45°$ b. $\alpha_{up}=\alpha_{max}-90°$ if $\alpha_{max}\geq 45°$ c. $\alpha_{up}=\alpha_{max}+90°$ if $\alpha_{max}\leq 45°$ A corresponding spin-up gradient ($B_{up}$) can be defined as $|\vec{u}|$ when $|\alpha_{max}|<45°$ and $-|\vec{u}|$ otherwise.

Figures 5A, 5B:
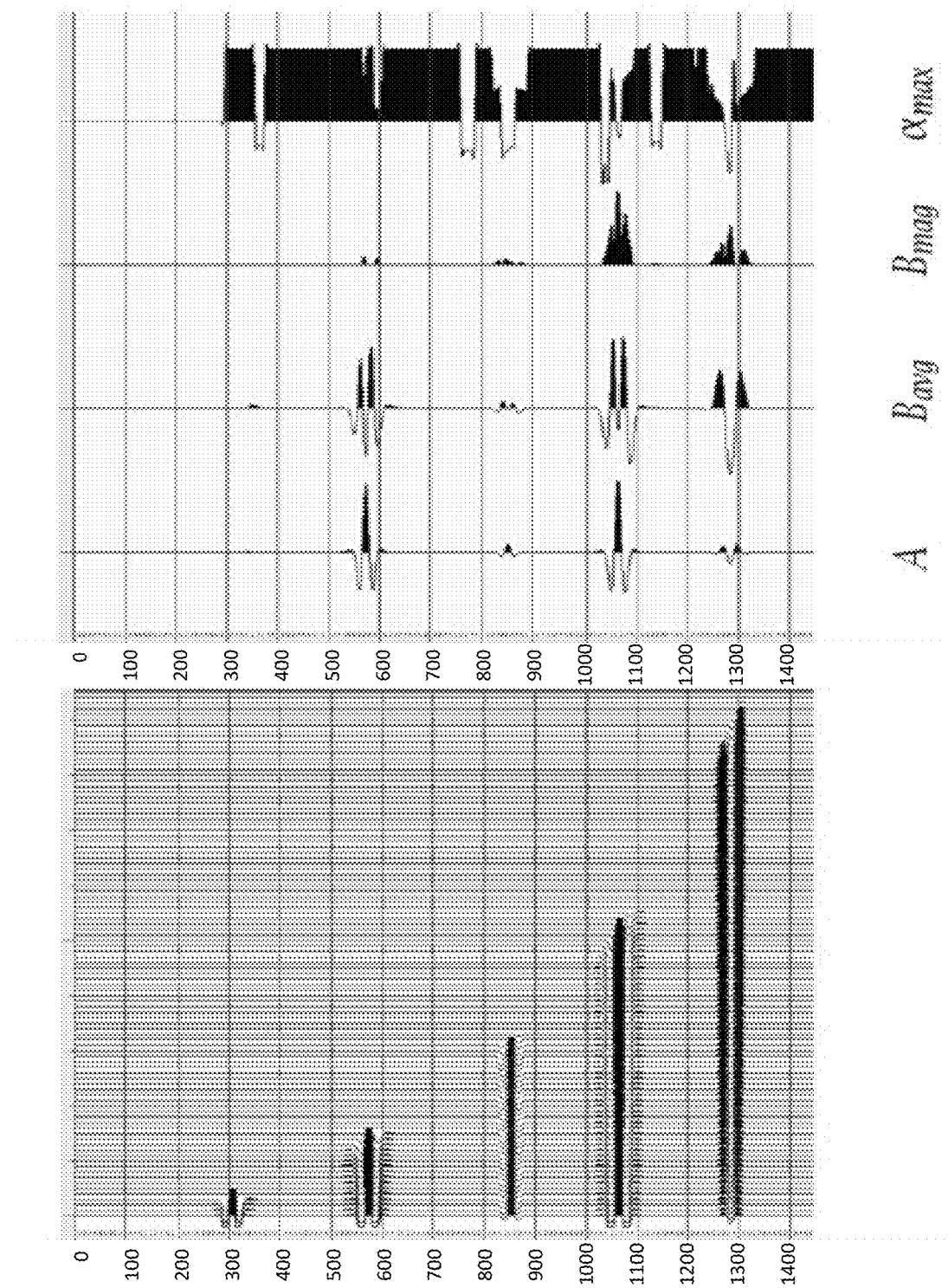
FIG. 5A shows a synthetic reflectivity gather that was processed by standard methods.
FIG. 5B shows corresponding anisotropy parameters obtained by point-wise methods.

Referring to FIG. 4D, $\alpha_{up}$ does not switch directions as the seismic polarity reverses. However, it is constrained to lie within ±45°. If the true symmetry azimuth is, for example, 60°, $\alpha_{up}$ will come out to be −30°. It is also evident that $\alpha_{up}$ is unstable when $B_{cos}$ is near zero and $B_{sin}$ is negative. This is acceptable since spin-up azimuths of 45° and −45° are equivalent. $\alpha_{up}$ is also unstable around zero-crossing of $\alpha_{max}$. The spin-down azimuths can be obtained from the spin-up azimuths from the following:

a. $\alpha_{down}=\alpha_{up}-90°$ if $\alpha_{up}>0$ b. $\alpha_{down}=\alpha_{up}+90°$ if $\alpha_{up}<0$ Synthetic Data Example To obtain a more realistic example, synthetic data for a 1-D model was generated. 141 synthetic traces with random source-receiver azimuths and offsets ranging from 0 to 3.1 km were selected. These data underwent azimuthal velocity analysis using trim statistics to align events to be as flat as possible at each time sample. The data were top muted to an angle of about 45° and a 20 db/s gain was applied. Every other one of the resulting traces are shown in FIG. 5A. Incidence angles vwere computed and regression was carried out. Average gradient $B_{avg}$ was destretched. Components of the estimate vector $\vec{X}$ are shown as first four traces in FIG. 5B. Spin-up gradient and azimuth traces were then computed using the pointwise method.

Comparing these results with theoretical ones computed from equation 4 and listed in Table 1, there is a qualitative (but not quantitative) agreement of the average and spin-up gradient estimates. The lack of quantitative agreement may be due to computation of spherical divergence and incidence angle, which assumes isotropic media. Estimates of spin-up and maximum-amplitude azimuths were very unstable, taking on virtually every possible value, depending precisely on where they were sampled. This instability may be due to slight time misalignments of the seismic data at different source-receiver azimuths and/or slightly amount of noise that is present in the synthetic data.

Windowed Statistical Method

The windowed statistical method of performing AVAZ analysis can obtain estimates of symmetry azimuth $\alpha_{sym}$ that is more stable in the presence of noise and small misalignments of the data from one azimuth to the next as well as resolve the ambiguity problem. For a single interface with ideal data, a crossplot of these $B_{sin}$ versus $B_{cos}$ estimates would form a straight line, as the band-limited $B_{ani}$ varies over positive and negative values. The slope of this line is affected by the symmetry azimuth, as shown in FIGS. 6A-6H. FIG. 6A shows for $\alpha_{sym}=-22.5°$. FIG. 6B shows for $\alpha_{sym}=0°$. FIG. 6C shows for $\alpha_{sym}=22.5°$. FIG. 6D shows for $\alpha_{sym}=45°$. FIG. 6E shows for $\alpha_{sym}=67.5°$. FIG. 6F shows for $\alpha_{sym}=-90°$. FIG. 6G shows for $\alpha_{sym}=-67.5°$. FIG. 6H shows for $\alpha_{sym}=-45°$. For example, if $\alpha_{sym}=0°$, equation (6) shows that $B_{sin}=0$, and the line would have zero slope. If $\alpha_{sym}=45°$, then $B_{cos}=0$ and the line is vertical. If $\alpha_{sym}=22.5°$, the $B_{cos}$ and $B_{sin}$ attributes are equal, and will plot along a 45° line. However, these crossplot slopes are not unique. A symmetry azimuth of 67.5° would also have a 45° slope.

Figure 7A:
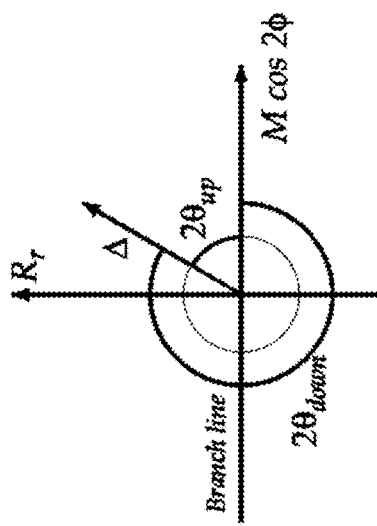
FIGS. 7A-7D show down and up interpretations of same joint distribution of $a=B_{cos}$ and $b=B_{sin}$ for $\theta_{up}=30°$.
Figure 7B:
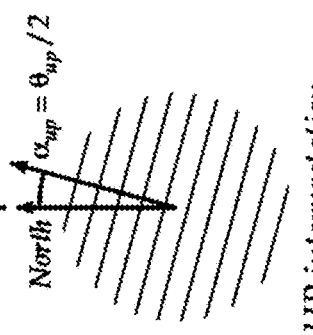
Figure 7C:
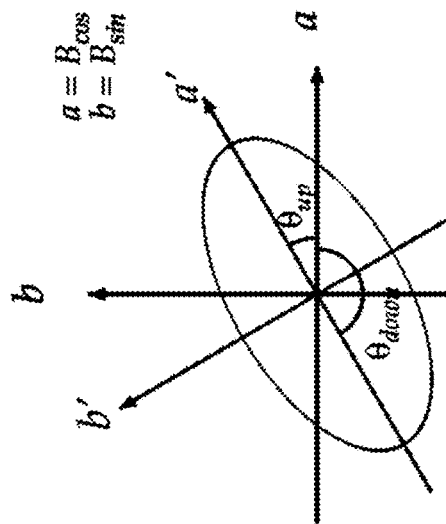
Figure 7D:
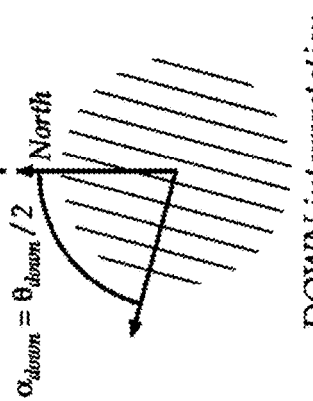
Figure 8:
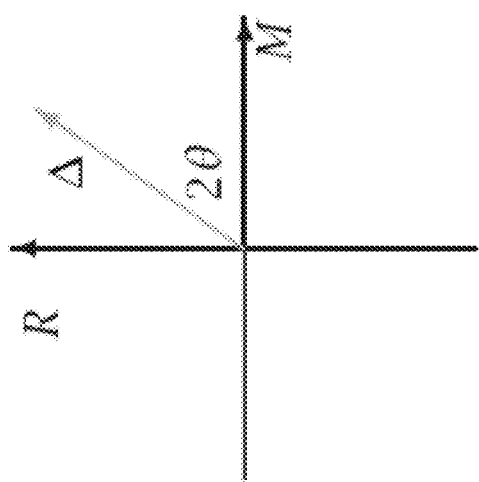
FIG. 8 shows an embodiment as described in the detailed description.

More realistically, a crossplot of $B_{sin}$ versus $B_{cos}$ over an arbitrary window of data would produce an approximate elliptical distribution of points, similar to ellipse shown in FIG. 7A. FIG. 7B shows plot of the down interpretation. FIG. 7C shows plot of $R_r$ vs $M \cos 2\phi$. FIG. 7D shows plot of the up interpretation. This window could form a rectangular prism centered about an analysis point, about which joint statistical parameters of the data would be attributed. Alternatively, the window would follow interpreted geological markers, as shown in FIG. 8. A weighting function could be constructed within the window, which gradually reduces emphasis placed on data samples near edge of the window.

An input vector can be formed from $B_{cos}$ and $B_{sin}$ input traces:

$$\vec{s}(t) = \begin{bmatrix} a(t) \\ b(t) \end{bmatrix} = \begin{bmatrix} B_{cos}(t) \\ B_{sin}(t) \end{bmatrix} \quad (11)$$

The joint correlation matrix of $\vec{s}$ is the expected value of $\vec{s}\vec{s}^T$ averaged over a sliding time-space window. This correlation is the 2×2 matrix $\Phi_{\vec{s}}$, which is computed as $$\Phi_{\vec{s}} = E\{\vec{s}\vec{s}^T\} = \begin{pmatrix} \sigma_a^2 & R \\ R & \sigma_b^2 \end{pmatrix} \quad (12)$$

whose elements are slowly-varying functions of time and space. They are computed by convolving the data in a super-gather by the weighting functions described.

A unitary matrix, $U^\dagger$, can be found which transforms input signal vector $\vec{s}$ into a new predicted anisotropy signal $$\vec{s}' = U^\dagger \vec{s} = [a'\, b']^T \quad (13)$$

whose components a' and b' are uncorrelated with each other. The stronger prediction component, a', referred to as the background while the weaker component, b', is referred to as the anomaly. The correlation matrix $\Phi_{\vec{s}'}$ of the predicted signal is given by $$\Phi_{\vec{s}'} = E\{\vec{s}'\vec{s}'^\dagger\} \quad (14)$$
$$= E\{U^\dagger \vec{s}\vec{s}^\dagger U\}$$
$$= U^\dagger \Phi_{\vec{s}} U$$
$$= U^{-1} \Phi_{\vec{s}} U$$
$$= \begin{pmatrix} \sigma_{a'}^2 & R' \\ R' & \sigma_{b'}^2 \end{pmatrix}$$

It is required that the unitary transform $U^\dagger$ make $\sigma_{a'} \geq \sigma_{b'}$, and $R'=0$.

Real Solutions

If $a(t)$ and $b(t)$ are real seismic traces, with no quadrature (imaginary) component, joint statistics can be computed as follows:

$$\sigma_a^2 = 1/N \sum_{j=1}^{N} a_j^2 \quad (15)$$

$$\sigma_b^2 = 1/N \sum_{j=1}^{N} b_j^2 \quad (16)$$

$$R = 1/N \sum_{j=1}^{N} a_j b_j \quad (17)$$

where the sums are over a sliding window. The statistics P is defined to be the average power in a and b, and M to be half the difference in powers between a and b:

$$P = \tfrac{1}{2}(\sigma_a^2 + \sigma_b^2) \quad (18)$$

$$M = \tfrac{1}{2}(\sigma_a^2 - \sigma_b^2) \quad (19)$$

A coordinate rotation by an angle of $\theta$ can be obtained by pre-multiplying the signal vector $\vec{s}$ by the unitary matrix $$U^\dagger = \begin{pmatrix} \cos\theta & -\sin\theta \\ \sin\theta & \cos\theta \end{pmatrix} \quad (20)$$

where $2\theta$ is the angle (M, R) vector makes with the M axis. As shown in FIG. 8 and in FIG. 3b:

$$2\theta = a\tan 2[R, M] - 2n\pi \quad (21)$$

where a tan 2 [y, x] is the clockwise angle from the x-axis to the vector (y, x) and where n is any integer. If n is an even number, $\theta$ is said to be a spin-up solution. If it is odd, it is said to be a spin-down solution. Since all solutions having the same parity are equivalent, n=0 can be used for the spin-up solution and n=sign ($\theta_{up}$) for the spin-down solution. These choices ensure that both up and down rotation angles will always be between ±180° as shown in FIGS. 7A-7D. More generally, it is always possible to choose a rotation angle in the range of a range of $\alpha_p \pm 90°$, where $\alpha_p$ is an arbitrary preferred azimuth opposite the branch line shown in FIGS. 7A-7D.

Complex Solutions

The real solution can suffer from several limitations. Slight misalignments in the $B_{cos}$ and $B_{sin}$ traces can lead to large variations in the computed azimuths. Due to the narrow-band nature of seismic data, these time differences can manifest themselves as approximate phase difference between these traces. To overcome this difficulty, equation (11) can be generalized to:

$$\vec{s}(t) = \begin{bmatrix} a(t) \\ b(t) \end{bmatrix} = \begin{bmatrix} B_{cos}(t) \\ B_{sin}(t) \end{bmatrix} + i \begin{bmatrix} Hi\{B_{cos}(t)\} \\ Hi\{B_{sin}(t)\} \end{bmatrix} \quad (22)$$

Where Hi{ } denotes the 90° phase-rotated signal (also known as the Hilbert transform). The complex correlation matrix $$\Phi_{\vec{s}} = E\{\vec{s}\vec{s}^\dagger\} = \begin{pmatrix} \sigma_a^2 & R \\ R^* & \sigma_b^2 \end{pmatrix} \quad (23)$$

where $$\sigma_a^2 = 1/N \sum_{j=1}^{N} |a_j|^2; \quad \sigma_b^2 = 1/N \sum_{j=1}^{N} |b_j|^2; \quad (24)$$

$$R = 1/N \sum_{j=1}^{N} a_j b_j^* = R_r + iR_i$$

and where $a_j$ and $b_j$ are samples of the continuous functions $a(t)$ and $b(t)$. In the complex case, the matrix $U^\dagger$, which diagonalizes $\Phi_{\vec{S}}$ and makes $R'=0$ in equation (14), is not unique. However, a preferred embodiment chooses a unitary matrix of the form $$U^\dagger = \begin{pmatrix} e^{-i\phi}\cos\theta & -e^{-i\phi}\sin\theta \\ e^{-i\phi}\sin\theta & e^{-i\phi}\cos\theta \end{pmatrix} \quad (25)$$

Note that it is a function of two angles, $\theta$ and $\phi$. The latter represents half the phase difference between $B_{cos}$ and $B_{sin}$. To diagonalize $\Phi_{\vec{S}}$ $$2\phi = a\tan 2[R_i \text{sign}(R_r), |R_r|] - 2m\pi \quad (26)$$

$$2\theta = a\tan 2[|R|\text{sign}(R_r), M] - 2n\pi \quad (27)$$

The result is an exact complex solution. If the exact anisotropic power $\Delta_e$ is denoted to be the length of the (M, R) vector, then eigenvalues $\{\sigma_{a'}, \sigma_{b'}\}$ of the predicted correlation matrix $\Phi_{\vec{S}}$ (which will match those of the original correlation matrix $\Phi_{\vec{S}}$) are $P+\Delta$ and $P-\Delta$, respectively. The Cauchy-Schwarz inequality establishes that $|R|^2 \leq \sigma_a^2 \sigma_b^2$, so $$\Delta_e = \sqrt{|R|^2 + M^2} \leq \sqrt{\sigma_a^2 \sigma_b^2 + M^2} = P \quad (28)$$

If the coefficient of anisotropy $C_a$ is denoted to be $\Delta_e/P$, then value of $C_a$ lies between 0 and 1. The magnitude of anisotropy $B_{mag}$ is $\sqrt{2\Delta_e}$.

For m=0, value $\phi$ is restricted to lie within range ±45°. This means that actual phase difference that is tolerated is ±90°. If actual phase difference gradually exceeds this, it will result in a sudden discontinuity in the estimate of $\theta$. This is a branch line in the $\phi$ direction. Since such discontinuities are generally undesirable, an alternative solution can be expressed as $$2\phi = \sin^{-1}(R_i/P) \quad (29)$$

$$2\theta = a\tan 2[R_r, M\cos 2\phi] - 2n\pi \quad (30)$$

These solutions yield identical results as the exact solution given noise-free data, but gradually drive the estimate of the phase difference φ to zero as the noise level increases. Phase differences between the a and b traces approaching 45° masquerade as isotropic zones. Without determining spin boundaries in the phase direction, it is difficult or impossible to eliminate discontinuities in the a' and b' gradients. For this reason, a modified definition of anisotropic power may be preferable:

$$\Delta_r = \sqrt{R_r^2 + M^2 \cos^2 2\phi} = \sqrt{R_r^2 + M_r^2} \qquad (31)$$

where $M_r = M \cos 2\phi$ is the robust power difference in a and b, taking into account possible phase differences between them. It becomes clear that $\Delta_r \leq \Delta_e \leq P$. The spin-up azimuth $\alpha_{up}$ is found to be $\frac{1}{2}\theta_{up}$ and the spin-down azimuth $\alpha_{down}$ is $\frac{1}{2}\theta_{down} = \alpha_{up} - \frac{1}{2}\pi \text{sign}(\alpha_{up})$.

Figures 10A, 10B:
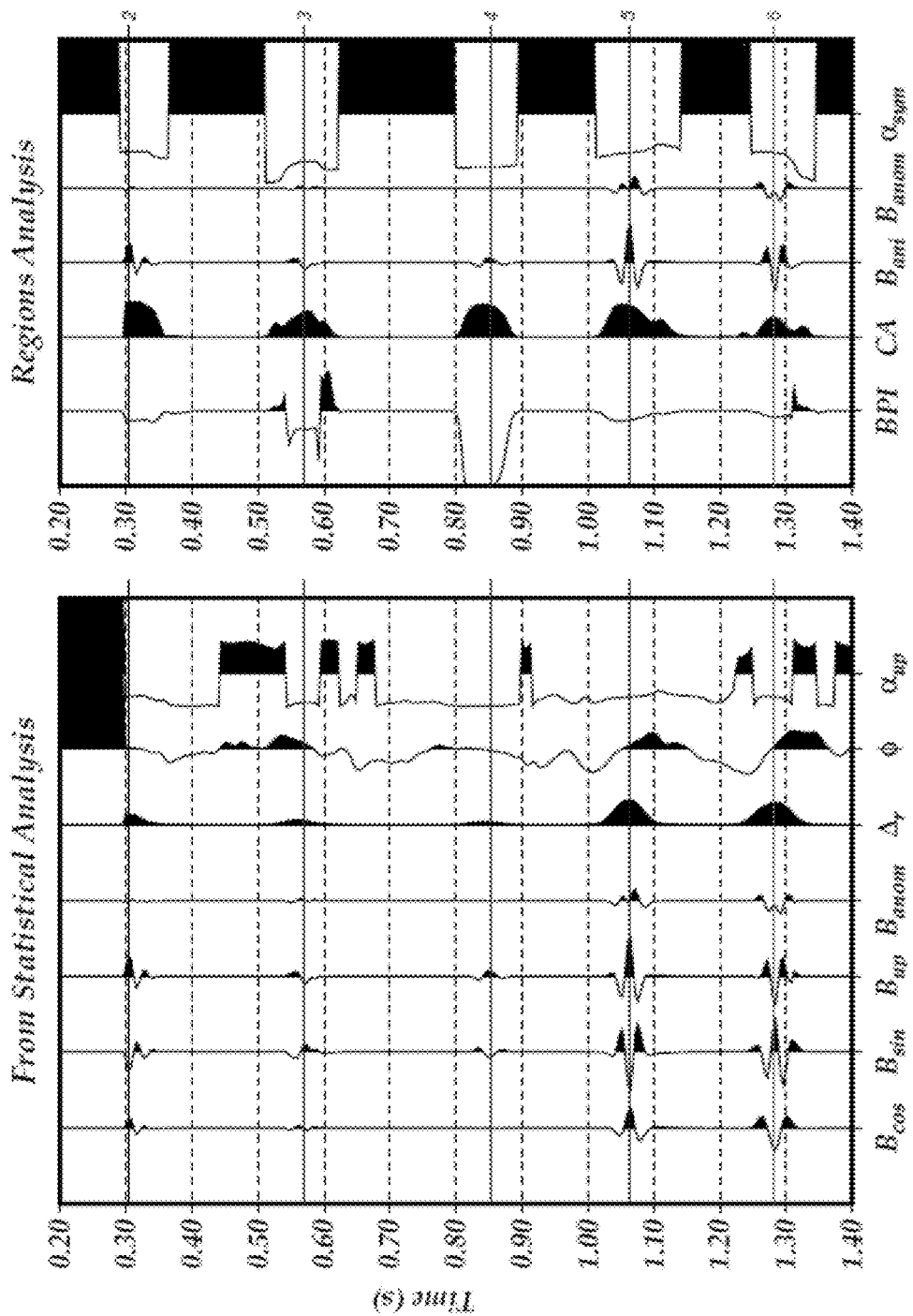
FIGS. 10A-10B show various synthetic results using windowed statistical method (a) before and (b) after regions analysis.

FIG. 10A shows the results of this analysis on the synthetic gather of FIG. 5. The first two traces, $B_{cos}$ and $B_{sin}$, represent azimuthal gradient in Cartesian coordinates aligned along the seismic survey axes. They come directly from the least-squares analysis. Next two traces, $B_{up}$ and $B_{anom}$, represent the azimuthal gradient in Cartesian coordinates along and perpendicular to the spin-up symmetry axis ($\alpha_{up}$). The $B_{anom}$ has a smaller rms magnitude than $B_{up}$. The next trace ($\Delta_r$) is the robust magnitude of anisotropy. The φ trace shows the estimated phase differences between $B_{cos}$ and $B_{sin}$. This can range in values from −32° to 23°.

Referring to FIG. 10A, the last trace shows the estimated spin-up azimuth ($\alpha_{up}$) obtained from $\frac{1}{2}\theta_{up}$ estimated with a 30 ms time window. It is constrained to lie within ±45° with an azimuth of 45° being equivalent to an angle of +45°. Events 3 and 4 are supposed to have a symmetry azimuth of −45°, which is the branch angle that transitions between spin-up and spin-down. These spin transitions are visible as sharp 90° azimuth jumps at 544 and 594 ms. $B_{up}$ and $B_{anom}$ would reveal abrupt polarity flips at these times although their amplitudes at these times are low. These sudden flips in azimuth and polarity are symptomatic of inherent ambiguity of AVAZ analysis, which are further alleviated by regions analysis, described next. FIG. 10B shows the synthetic results using windowed statistical method after regions analysis.

Regions Analysis

The rotation angle θ and the symmetry azimuth a are obtained from the windowed statistic method by computing the angle of the $\vec{S} = (M_r, R_r)$ statistics vector shown in the upper right portion FIG. 7A. If length $\Delta_r$ of this vector is sufficiently large, then an incremental change in either $R_r$ or $M_r$ or both will lead to an incremental change in the rotation angle, except at the branch line (shown in thick bold). Since the symmetry azimuth is half the rotation angle, the angle 2θ of the statistic vector should be determined to within ±360° by tracking how many times the vector rotates completely around the circle without plunging into the incoherent zone near the origin. This can be done by subdividing the ($M_r$, $R_r$) plane into a circular incoherent zone (Zone 0) centered around the origin and $2N_z$ coherent zones outside this circle as shown in FIG. 11A. Radius of this circle can be chosen to be $kP_s$ where k is a positive number less than one (minimum coefficient of anisotropy) and $P_s$ is a stabilized average power in the $B_{cos}$ and $B_{sin}$ traces averaged over the correlation window:

$$P_S = \frac{1}{2}(\sigma_a^2, \sigma_b^2) + [\text{other term}] \qquad (32)$$

The 3-D seismic volume can then be subdivided into a set of contiguous interconnected regions, each of which resides within a single zone in the ($M_r$, $R_r$) plane (FIGS. 11B and 11C). Other terms may be included in equation (32) to further subdivide coherent regions into smaller sub-regions to make them less interconnected with one another. This will afford greater flexibility in assigning spins.

Valid boundaries between regions are those that do not skip across Zone 0. These would include, for example, a boundary between Zones 1 and −1 but not between Zones 1 and −2. If too many boundaries are not valid, the ($M_r$, $R_r$) plane may have to be subdivided again using a larger radius for the incoherent zone. Chains of coherent regions that are connected through valid boundaries are then assembled and recursively inspected for parity violations. A parity violation occurs if any circular pathway through the 3-D volume passes through an odd number of valid coherent boundaries. For each parity violation, one of the boundaries can be designated as weakest. The weakest boundary could be one having smallest surface area or smallest average coherence. Conflicts may be resolved or avoided by marking the smaller of the two regions across the weakest boundary as being incoherent. If this eliminates too much of the 3-D volume, an alternative is to eliminate the weakest boundary although this can cause that boundary to retain its abrupt change in polarity of $B_{back}$ and $B_{anom}$ and cause the estimation of symmetry azimuth to suddenly shift by 90°.

Starting from an arbitrary region in the chain, initial spins are consistently assigned to the coherent regions contained in the chain so that a reversal in spin occurs only when a valid spin-flip boundary is crossed from either direction. Spin-flip boundaries are shown as dashed lines in FIGS. 11A-11C. They represent a transition between coherent zones $N_z$ and $−N_z$. Initial spins can then be converted into final spins by reversing all the spins in each coherent chain according to the following hierarchy:

1. If one or more pseudo-wells (actual or hypothetical) with known spins penetrate the regions of coherent chain and if a majority of these spins contradict the initial spins, then all of the spins of the chain should be reversed. If the majority of the well spins agree with the initial spins, then the final spins are set to match the initial spins.
2. If the final spins of a chain were not determined by pseudo-wells but one or more seismic horizons with known spins or $B_{back}$ polarities are known or conjectured, then if a majority of these spins or polarities conflict with those that were initially assigned then all of the spins of the chain should be reversed. On the other hand, if a majority of these spins or polarities match those that were initially assigned then the final spins should be set equal to the initial spins.
3. If the final spins of a chain were determined by neither pseudo-wells nor horizons then the final spins of the chain are either set to match or oppose the initial spins so as to make the majority of spins (based on volume) to match a predetermined regional spin.

Figure 9:
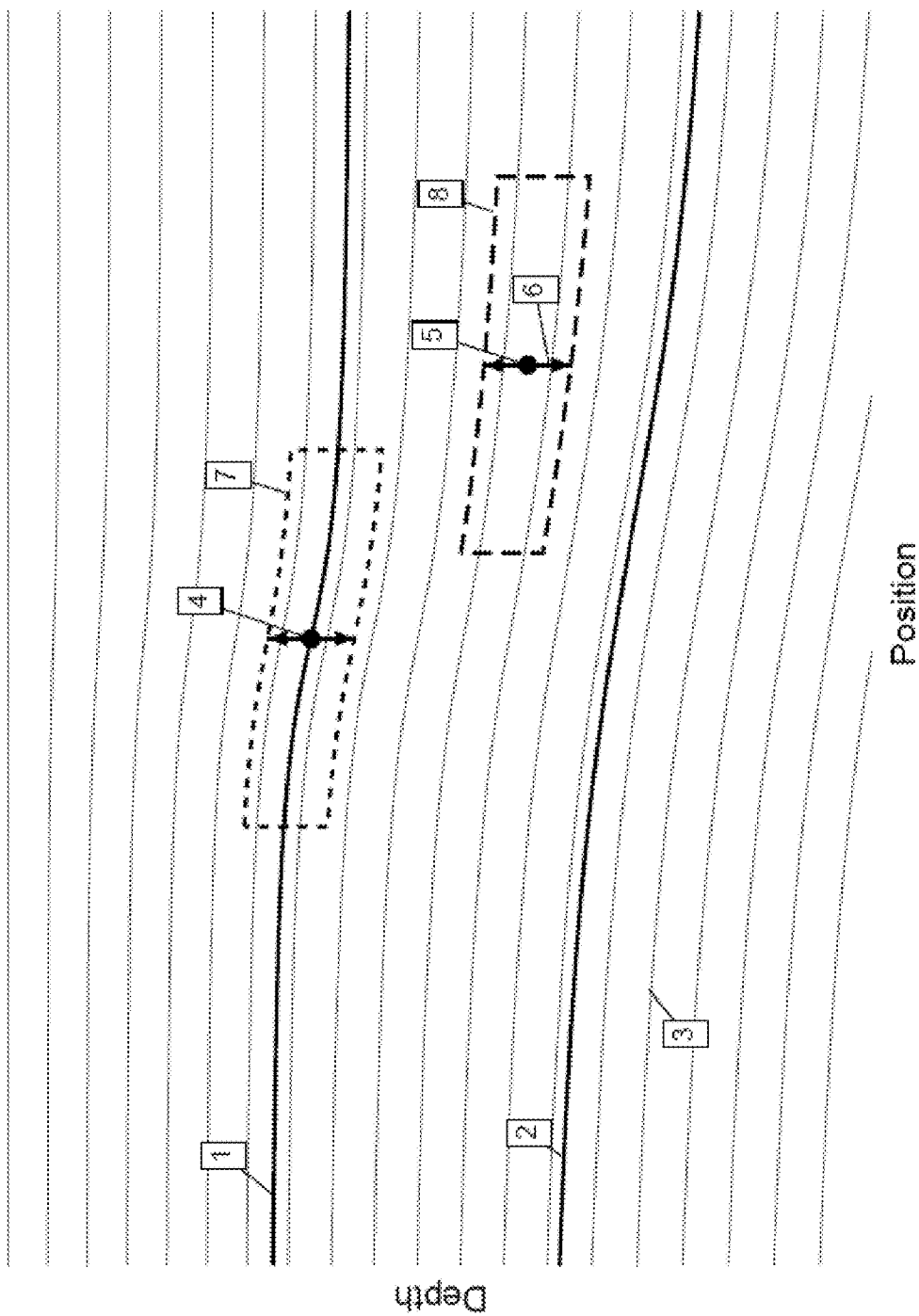
FIG. 9 illustrates that joint correlations can be calculated within variable-height windows that conform in depth to geologic horizons [1, 2] and interpolated horizons [3]. Each window have fixed lateral widths, fixed vertical height [6] at window's analysis point [4, 5] about which the window is centered.

FIG. 9 illustrates that joint correlations can be calculated within variable-height windows that conform in depth to geologic horizons [1, 2] and interpolated horizons [3]. Each window have fixed lateral widths, fixed vertical height [6] at window's analysis point [4, 5] about which the window is centered. FIG. 10B shows the results of this analysis on the synthetic gather of FIG. 5A. Only two coherent zones were used for this example, corresponding to FIG. 10A ($N_z==1$). The traces labeled BPI is the Branch Proximity Indicator given by $$BPI = \frac{\sin 2(\theta_{up} - \theta_p)}{\sin^2 X + \cos^2(\theta_{up} - \theta_p)} \quad (33)$$

In this case, the preferred azimuth $\theta_p=0°$ and the width of the indicator was $X=1°$. This indicator is used to determine when branch line opposite the preferred azimuth (180° in this case) is crossed. It will suddenly switch polarity when this happens (i.e., at spin-reversal points 544 and 594 ms). The trace labeled "CA" represents the Coefficient of Anisotropy. This is always a positive number between 0 and 1, which denotes the normalized anisotropy magnitude, $CA=\Delta_s/P_s$. Additional term included in equation (32) was 5% of the average AVO gradient $B_{avg}$ smoothed over a 1000 ms window. This was done so as to cause the CA to fall to zero in the no-data zones between events. Minimum threshold of anisotropy (k) was set to 0.1 which caused each reflector to be placed into a separate coherent region. The trace labeled $\alpha_{sym}$ is the estimate of the symmetry azimuth. Once the azimuth is estimated, it can be used as a component of the azimuthal gradient in its direction ($B_{ani}$) and in its perpendicular direction ($B_{anom}$).

In comparing the right-most traces of FIGS. 10A and 10B, it should be apparent that the windowed statistical method followed by regions analysis produced a more stable estimate of fracture symmetry azimuth than the convention point-by-point method. Furthermore, the results of the former method were accurate to within 2% of their correct values. Zones which cannot be computed due to lack of data are clearly marked in black.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims, while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. Al-Shuhail, A. A., 2007, Fracture-porosity inversion from P-wave AVOA data along 2D seismic lines: An example from the Austin chalk of southeast Texas: Geophysics, 72, no. 1, B1-B7.
2. Davidson, M., Swan, H., Sil, S., Howell, J., Olson, R., and Zhou, C., 2011, A robust workflow for detecting azimuthal anisotropy: SEG, Expanded Abstracts, 30, no. 1, 259-263.
3. Davison, C., Ratcliffe, A., Grion, S., Johnston, R., Duque, C., and Maharramov, M., 2011, Azimuthal AVO analysis: Stabilizing themodel parameters: SEG, Expanded Abstracts, 30, no. 1, 330-334.
4. Downton, J., and Gray, D., 2006, AVAZ parameter uncertainty estimation: SEG, Expanded Abstracts, 25, no. 1, 234-238.
5. Downton, J., Roure, B., and Hunt, L., 2011, Azimuthal Fourier coefficients: CSEG Recorder, 36, no. 10, 22-36.
6. Gray, D., and Head, K., 2000a, Fracture detection in Manderson field: A 3-D AVAZ case history: The Leading Edge, 19, no. 11, 1214-1221.
7. Gray, D., Roberts, G., and Head, K., 2002, Recent advances in determination of fracture strike and crack density from P-wave seismic data: The Leading Edge, 21, no. 3, 280-285.
8. Gray, F. D., Zellou, A., Todorovic-Marinic, D., and Boerner, S., 2005, Reservoir fracture characterization: U.S. Pat. No. 6,928,367.
9. Jenner, E., and Williams, M. C., 2004, System for estimating azimuthal variations in seismic data: U.S. Pat. No. 6,681,184.
10. Jenner, E., 2002, Azimuthal AVO: Methodology and data examples: The Leading Edge, 21, no. 8, 782-786.
11. Mallick, S., and Frazer, L. N., 1987, Practical aspects of reflectivity modeling: Geophysics, 52, no. 10, 1355-1364.
12. Mallick, S., Chambers, R. E., and Gonzalez, A., 1996, Method for determining the principal axes of azimuthal anisotropy from P-wave data: U.S. Pat. No. 5,508,973.
13. Mallick, S., Craft, K. L., Meister, L. J., and Chambers, R. E., 1998, Determination of the principal directions of azimuthal anisotropy from P-wave seismic data: Geophysics, 63, no. 2, 692-706.
14. Rüger, A., and Tsvankin, I., 1997, Using AVO for fracture detection: Analytic basis and practical solutions: The Leading Edge, 16, no. 10, 1429-1434.
15. Rüger, A., 1995, P-wave reflection coefficients for transversely isotropic media with vertical and horizontal axis of symmetry: SEG, Expanded Abstracts, 14, 278-281.
16. Rüger, A., 1997, Plane wave reflection coefficients for transversely isotropic models with vertical and horizontal axis of symmetry: Geophysics, 62, no. 3, 713-722.
17. Rüger, A., 2000, Variation of P-wave reflectivity with offset and azimuth in anisotropic media: SEG Books, 20, 277-289.
18. Swan, H. W., 1990, Amplitude versus offset measurement errors in a finely layered medium: Geophysics, 56, no. 1, 41-49.
19. Thomsen, L., 1986, Weak elastic anisotropy: Geophysics, 51, no. 10, 1954-1966.
20. Tsvankin, I., 1996, Pwave signatures and notation for transversely isotropic media: An overview: Geophysics, 61, no. 2, 467-483.
21. Wang, J., Zheng, Y., and Perz, M., 2007, VVAZ vs. AVAZ: Practical implementation and comparison of two fracture-detection methods: SEG, Expanded Abstracts, 26, no. 1, 189-193.
22. Whitcombe, D. N., Dyce, M., McKenzie, C. J. S., and Hoeber, H., 2004, Stabilizing the AVO gradient: SEG, Expanded Abstracts, 23, no. 1, 232-235.
23. Xu, X., and Tsvankin, I., 2006, Azimuthal AVO analysis with anisotropic spreading correction: A synthetic study: The Leading Edge, 25, no. 11, 1336-1342.
24. Zheng, Y., and Larson, G., 2004, Seismic fracture detection: Ambiguity and practical solution: SEG, Expanded Abstracts, 23, no. 1, 1575-1578.

The invention claimed is:

1. A method for processing 3-D seismic data comprising:
   a) forming, using a computing processor, common image location gathers of seismic traces as a function of time or depth, offset, and azimuth;
   b) performing a linear regression on a gather at each time or depth to generate a model that includes an intercept term A, an average gradient term $B_{avg}$, an anisotropic gradient term $B_{cos}$, and an anisotropic gradient term $B_{sin}$;
   c) calculating joint correlations of $B_{cos}$ and $B_{sin}$ seismic traces over a plurality of rectangular prisms in lateral position and time or depth, each prism centered about its own analysis point;
   d) forming a vector whose rectangular coordinates are (M, R) for each analysis point, wherein M represent half of difference between mean-squared amplitudes of $B_{cos}$ and $B_{sin}$ within the prism, and R represent the average product of $B_{cos}$ and $B_{sin}$ within the prism;
   e) calculating angles 2 $\theta_{up}$ or 2 $\theta_{down}$ the vector makes with the M axis;
   f) taking one-half the rotation angles $\theta_{up}$ or $\theta_{down}$ as symmetry azimuths of vertical reservoir fractures; and
   g) determining azimuthal amplitude gradient based on the determined symmetry azimuth,
   wherein said common image location gathers of seismic traces describe subsurface heterogeneity of a reservoir.

2. The method of claim 1, wherein the intercept term A is independent of incident angle or azimuth.

3. The method of claim 1, wherein the average gradient term $B_{avg}$ depends only on squared sine of incident angle.

4. The method of claim 1, wherein the anisotropic term $B_{cos}$ depends on product of cosine of twice source-receiver azimuth and squared sine of incident angle.

5. The method of claim 1, wherein the anisotropic term $B_{sin}$ depends on product of sine of twice source-receiver azimuth and square sine of incident angle.

6. The method of claim 1, wherein length of the vector is taken to be squared magnitude of azimuthal anisotropy.

7. The method of claim 1, wherein the $B_{cos}$ and $B_{sin}$ traces are made analytic by combining the traces with $\sqrt{(-1)}$ times their respective Hilbert transforms.

8. The method of claim 1, wherein the joint correlations are formed by allowing Rc to represent average complex product of $B_{cos}$ times conjugate of $B_{sin}$ within each rectangular prism, $M_c$ to represent half of difference between mean-squared magnitudes of $B_{cos}$ and $B_{sin}$ within each prism; and $P_c$ to represent half of sum of mean-squared magnitudes of $B_{cos}$ and $B_{sin}$ within each prism.

9. The method of claim 1, wherein the joint correlation between the $B_{cos}$ and $B_{sin}$ is calculated within variable-height windows that conform in depth to geologic horizons.

10. A method for processing 3-D seismic data comprising:
    a) forming common image location gathers of seismic traces as a function of time or depth, offset, and azimuth;
    b) performing a linear regression, using a computing processor, on a gather at each time or depth to generate a model that includes an intercept term A, an average gradient term $B_{avg}$, an anisotropic gradient term $B_{cos}$ and an anisotropic gradient term $B_{sin}$;
    c) calculating joint correlations of $B_{cos}$ and $B_{sin}$ seismic traces over a plurality of rectangular prisms in lateral position and time or depth, each prism centered about its own analysis point;
    d) forming a vector whose rectangular coordinates are (M, R) for each analysis point, wherein M represent half of difference between mean-squared amplitudes of $B_{cos}$ and $B_{sin}$ within the prism, and R represent the average product of $B_{cos}$ and $B_{sin}$ within the prism;
    e) calculating angles 2 $\theta_{up}$ or 2 $\theta_{down}$ the vector makes with the M axis;
    f) determining one-half the rotation angles $\theta_{up}$ or $\theta_{down}$ as symmetry azimuths of vertical reservoir fractures;
    g) determining azimuthal amplitude gradient based on the determined symmetry azimuth; and
    h) detecting one or more subsurface heterogeneity utilizing the determined azimuthal amplitude gradient,
    wherein said common image location gathers of seismic traces describe subsurface heterogeneity of a reservoir.

11. The method of claim 10, wherein the intercept term A is independent of incident angle or azimuth.

12. The method of claim 10, wherein the average gradient term $B_{avg}$ depends only on squared sine of incident angle.

13. The method of claim 10, wherein the anisotropic term $B_{cos}$ depends on product of cosine of twice source-receiver azimuth and squared sine of incident angle.

14. The method of claim 10, wherein the anisotropic term $B_{sin}$ depends on product of sine of twice source-receiver azimuth and square sine of incident angle.

15. The method of claim 10, wherein length of the vector is taken to be squared magnitude of azimuthal anisotropy.

16. The method of claim 10, wherein the $B_{cos}$ and $B_{sin}$ traces are made analytic by combining the traces with $\sqrt{/(-1)}$ times their respective Hilbert transforms.

17. The method of claim 10, wherein the joint correlations are formed by allowing Rc to represent average complex product of $B_{cos}$ times conjugate of $B_{sin}$ within each rectangular prism, $M_c$ to represent half of difference between mean-squared magnitudes of $B_{cos}$ and $B_{sin}$ within each prism; and $P_c$ to represent half of sum of mean-squared magnitudes of $B_{cos}$ and $B_{sin}$ within each prism.

18. The method of claim 10, wherein the joint correlation between the $B_{cos}$ and $B_{sin}$ is calculated within variable-height windows that conform in depth to geologic horizons.

* * * * *